United States Patent
Salvo et al.

(10) Patent No.: US 8,891,872 B2
(45) Date of Patent: Nov. 18, 2014

(54) SYSTEM AND METHOD FOR IDENTIFYING PHYSICAL MARKINGS ON OBJECTS

(75) Inventors: Joseph Salvo, Schenectady, NY (US); John Carbone, Ballston Spa, NY (US); Lynn Ann Derose, Gloversville, NY (US); Daniel Messier, New Scotland, NY (US); Bouchra Bouqata, Troy, NY (US); Adam McCann, Clifton Park, NY (US); William Leonard, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 309 days.

(21) Appl. No.: 13/328,604

(22) Filed: Dec. 16, 2011

(65) Prior Publication Data

US 2013/0156313 A1    Jun. 20, 2013

(51) Int. Cl.
*G06K 9/34* (2006.01)

(52) U.S. Cl.
USPC ............ 382/177; 382/159; 382/195; 707/758

(58) Field of Classification Search
USPC .................. 382/159, 173, 177, 195; 707/758
See application file for complete search history.

(56) References Cited

U.S. PATENT DOCUMENTS

| | | | |
|---|---|---|---|
| 4,589,140 A | 5/1986 | Bishop | |
| 4,628,533 A * | 12/1986 | Hongo et al. | 382/205 |
| 4,727,497 A * | 2/1988 | Peters et al. | 345/568 |
| 4,809,344 A * | 2/1989 | Peppers et al. | 382/173 |
| 5,034,991 A * | 7/1991 | Hagimae et al. | 382/209 |
| 5,113,507 A | 5/1992 | Jaeckel | |
| 5,712,922 A | 1/1998 | Loewenthal | |
| 5,828,769 A | 10/1998 | Burns | |
| 5,829,009 A | 10/1998 | Frazier | |
| 5,893,668 A | 4/1999 | Harrison | |
| 6,244,764 B1 | 6/2001 | Lei | |
| 6,249,533 B1 * | 6/2001 | Goishi | 714/743 |
| 6,269,376 B1 | 7/2001 | Dhillon | |
| 6,392,747 B1 | 5/2002 | Allen | |
| 6,899,275 B2 | 5/2005 | Schramm | |
| 7,512,572 B2 | 3/2009 | Furber | |
| 7,840,914 B1 | 11/2010 | Agarwal | |
| 7,860,313 B2 | 12/2010 | Walch | |
| 7,912,283 B1 | 3/2011 | Repperger | |
| 2007/0263930 A1 | 11/2007 | Ito | |
| 2009/0003722 A1 | 1/2009 | Nadabar | |

(Continued)

OTHER PUBLICATIONS

Flynn et al.; "Sparse Distributed Memory: Principles and Operation"; Dec. 1989, NASA contracts Technical Report CSL-TR-89-400.*

(Continued)

*Primary Examiner* — Chan Park
*Assistant Examiner* — Eueng-Nan Yeh
(74) *Attorney, Agent, or Firm* — Seema S. Katragadda

(57) ABSTRACT

A system and method for identifying characters using a processor and a sparse distributed memory (SDM) module. The system and method are configured to receive image data relating to an object having a surface with physical markings thereon. The physical markings include characters-of-interest. The system and method are also configured to analyze the image data to convert at least one of the characters-of-interest in the image data into a corresponding feature vector. The system and method are also configured to identify the characters-of-interest using the feature vector and the SDM module. A suggested identity for the characters-of-interest is provided.

24 Claims, 5 Drawing Sheets

(56) References Cited

U.S. PATENT DOCUMENTS

| | | |
|---|---|---|
| 2009/0016600 A1 | 1/2009 | Eaton |
| 2009/0272812 A1 | 11/2009 | Marty |
| 2010/0188710 A1 | 7/2010 | Fan |
| 2010/0241745 A1 | 9/2010 | Offen |
| 2010/0312731 A1 | 12/2010 | Knoblauch |
| 2010/0327060 A1 | 12/2010 | Moran |

OTHER PUBLICATIONS

Larry M. Manevitz and Yigal Zemach, "Assigning meaning to data: Using sparse distributed memory for multilevel cognitive tasks," Neurocomputing, Jan. 1997, vol. 14 Issue: 1, pp. 15-39.

Hong and Chen, "Character recognition in a sparse distributed memory," IEEE Transactions on Systems, Man and Cybernetics, May/Jun. 1991, vol. 21, Issue: 3, pp. 674-678.

Flynn et al, "Sparse Distributed Memory: Principles and Operation," Technical Report CSL-TR-89-400, Dec. 1989.

Kuo-Chin Fan and Yuan-Kai Wang, "A Genetic Sparse Distributed Memory Approach to the Application of Handwritten Character Recognition"; Pattern Recognition, vol. 30, Issue 12, Dec. 1997, pp. 2015-2022.

Yawei Ma et al., "A new algorithm for characters segmentation of license plate based on variance projection and mean filter", Cybernetics and Intelligent Systems (CIS), 2011 IEEE 5th International Conference, Sep. 17-19, 2011, pp. 132-135.

Seong-Whan Lee et al., "A new methodology for gray-scale character segmentation and recognition", Pattern Analysis and Machine Intelligence, IEEE Transactions vol. 18, Issue 10, Oct. 1996, pp. 524-527.

\* cited by examiner

SYSTEM AND METHOD FOR IDENTIFYING PHYSICAL MARKINGS ON OBJECTS

BACKGROUND

A variety of items used in commerce include machine-readable markings that provide information about the items. The information may not only be used to determine a price of the item (e.g., when checking out at a supermarket) as in some cases, but can also be used to determine a production/usage history of an item (e.g., lot number, date of manufacture, and period of use). Items are often labeled with removable tags, or containers that hold the items can be labeled. In some instances, the markings are physically part of the item. For example, an automotive part can be directly marked through dot peening, etching, hammering, molding, casting, and the like.

Items that are directly marked may be exposed to conditions that are capable of damaging the physical markings. For example, a machine part may be used and then refurbished for a second lifetime of use. However, during use of the machine part or during the refurbishing process, the physical markings may become scratched, worn, soiled, or otherwise rendered more difficult to read. In some cases, if any one of the characters is unreadable for an individual or scanner, the part may be required to undergo more extensive analysis to identify the part or it may even be scrapped completely.

BRIEF DESCRIPTION

In accordance with various embodiments, a non-transitory computer readable medium for identifying characters using a processor and a sparse distributed memory (SDM) is provided. The computer readable medium includes instructions to command the processor to receive image data relating to an object having a surface with physical markings thereon. The physical markings include characters-of-interest. The instructions also command the processor to analyze the image data to convert at least one of the characters-of-interest in the image data into a corresponding feature vector. The feature vector includes a vector address and a data pattern. The instructions also command the processor to identify the character(s)-of-interest using the SDM. The SDM has hard locations that include a stored vector location address and a stored content counter. The identifying operation includes determining a relative distance between the vector address of the feature vector and the stored vector location addresses of the hard locations. The hard locations that are within a predetermined distance from the stored vector address are activated locations. The identifying operation also includes providing a suggested identity of the character-of-interest that is based upon the stored contents of the activated locations.

In accordance with other various embodiments, a system for identifying characters-of-interest from physical markings on a surface of an object is provided. The system includes an imager that is configured to capture an image of the physical markings on the object. The system also includes a segmentation module that is configured to analyze the image and convert at least one of the characters-of-interest into a corresponding feature vector. The feature vector includes a vector address and a data pattern. The system also includes an identification module that is configured to identify the character(s)-of-interest using a sparse distributed memory (SDM). The SDM has hard locations that include a stored vector location address and a stored content counter. The identification module is configured to determine a relative distance between the vector address of the feature vector and the location addresses of the hard locations. The hard locations that are within a predetermined distance from the vector address are activated locations. The identification module is also configured to provide a suggested identity of the character-of-interest that is based upon the stored contents of the activated locations.

In accordance with yet other various embodiments, a method of identifying characters from an object having physical markings is provided. The method includes receiving image data relating to an object having a surface with physical markings thereon. The physical markings include characters-of-interest. The method also includes analyzing the image data to convert at least one of the characters-of-interest into a corresponding feature vector. The feature vector includes a vector address and a data pattern. The method also includes providing hard locations that include a stored vector location address and a stored content counter. The method also includes identifying activated locations by determining a relative distance between the feature vectors and the stored vector location addresses of the hard locations. The relative distances between the feature vector and the activated locations are less than a predetermined distance. The method also includes providing a suggested identity of the character-of-interest that is based upon the stored contents of the activated locations.

DETAILED DESCRIPTION

Figure 1:
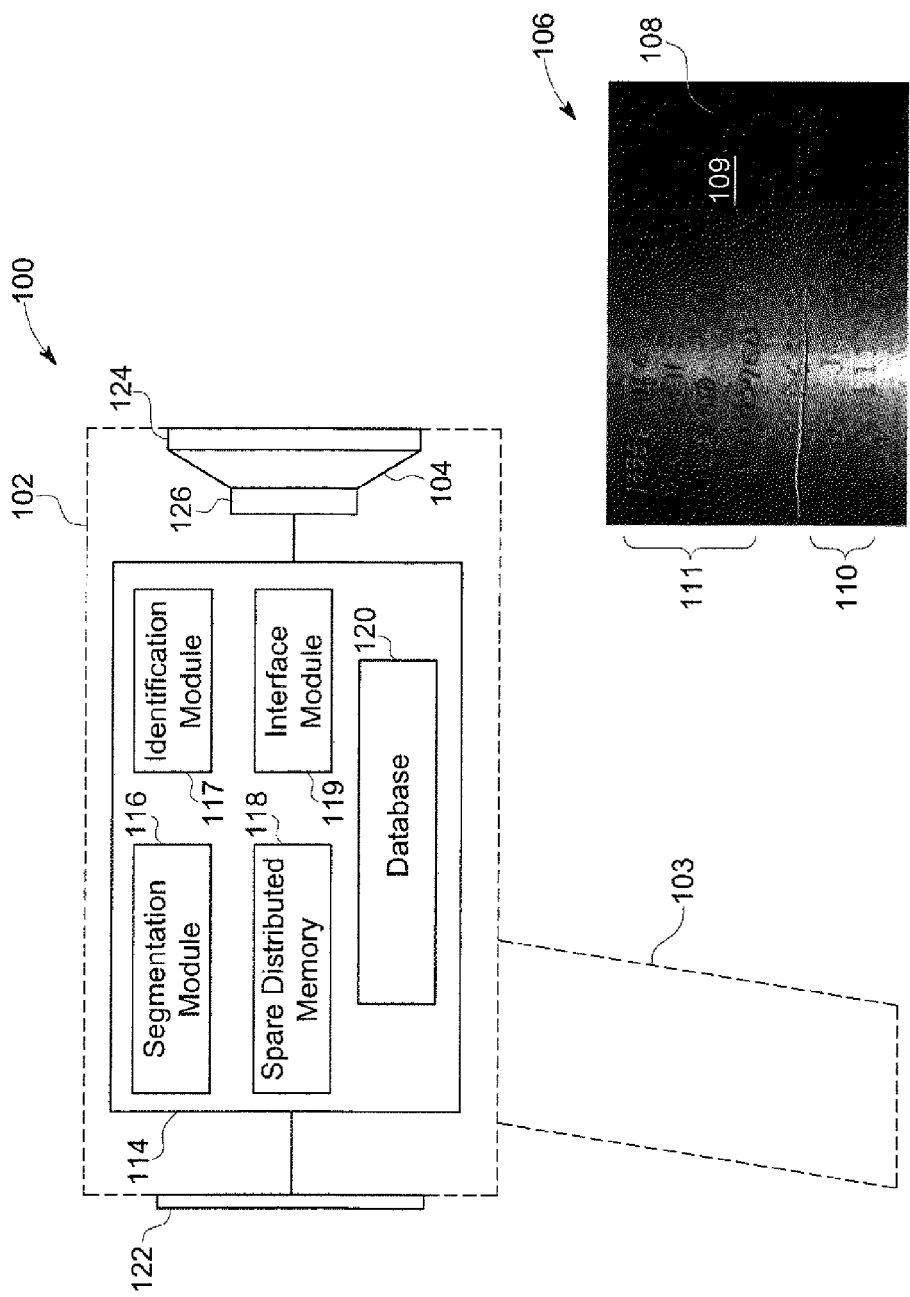
FIG. 1 is a schematic block diagram that illustrates an exemplary character-recognition system formed in accordance with one embodiment.

The following detailed description of certain embodiments will be better understood when read in conjunction with the appended drawings. To the extent that the Figures illustrate diagrams of functional blocks of various embodiments, the functional blocks are not necessarily indicative of the division between hardware. Thus, for example, one or more of the functional blocks may be implemented in a single piece of hardware or multiple pieces of hardware. It should be understood that the various embodiments are not limited to the arrangements and instrumentality shown in the drawings. Additionally, the system blocks in the various Figures or the steps of the methods may be rearranged or reconfigured.

As used herein, an element or step recited in the singular and proceeded with the word "a" or "an" should be understood as not excluding plural of said elements or steps, unless such exclusion is explicitly stated. Furthermore, references to "one embodiment" or "an exemplary embodiment" and the like are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 schematically illustrates an exemplary character-recognition system (or reader) 100 formed in accordance with one embodiment. The system 100 is configured to analyze an image of a surface of an object that has markings that include characters or symbols thereon and provide an indication or estimation as to the identity of a character(s)-of-interest. The system 100 may also be configured to acquire the image of the surface of the object. Although not required, at least one of the characters-of-interest may be difficult to read by an individual or conventional reader system. For instance, the characters-of-interest may be scratched, chipped, dirtied, improperly printed, have a small type-font, or are otherwise difficult to read.

In various embodiments, the markings are configured to identify and/or provide information about the object that has the markings. For example, the markings can be used to determine any information about the manufacture or subsequent use of the object, such as a date of production, the particular manufacturer or plant that made the object, composition of the material(s) used, when and by whom the object was inspected, when and how long the object was used, the machine that used the object, and the like.

Embodiments described herein may be used to analyze imaged markings on an object. The imaged markings may include characters or symbols that are part of an identification system. In particular embodiments, the markings are physical markings. As used herein, "physical markings" include markings that are at least partially made by morphological changes along the surface of the object. As opposed to two-dimensional markings made on paper, physical markings may be three-dimensional. For example, objects described herein may have physical markings that were formed by changing a relatively smooth surface through dot peening, etching, hammering, scratching, stamping, impressing, and the like. Physical markings may also be made through molding, casting, and the like in which, for example, a material is poured into a mold and allowed to cure, set, or otherwise harden. The above examples are not intended to be limiting and, as such, physical markings could be made through other processes. Moreover, the use of the term "markings" is not intended to be limited to a particular language or identification system. For example, the markings may include letters of a recognizable language and numbers (i.e., alphanumeric characters). The markings may also include other recognizable symbols (e.g., Greek symbols) or symbols specifically designed for a particular identification system.

An object may include more than one type or style of marking. For example, at least one of the physical markings may be cast or molded by the manufacturer while other markings may be dot peened by the vendor or user of the object. The physical markings may be located on a planer surface or a surface that has some curvature or contour.

Although embodiments described herein are described with particular reference to physical markings, other embodiments may be used to image and analyze two-dimensional markings. For example, the imaged markings could be made by applying ink or paint to cardboard containers, envelopes, paper, or other substantially planar surfaces. As such, when the terms "markings," "characters," or "characters-of-interest" are not modified by "physical," the term includes two-dimensional markings, characters, symbols, and the like.

The objects imaged may be any item capable of having the markings made thereon. In particular embodiments, the object is a mechanical item configured to be used in a machine or other industrial application in which the object has physical markings on surface(s) of the object. For example, the objects could be automotive parts or aircraft parts (e.g., rotors). The objects can be large and heavy such that the objects must be scanned one at a time by an individual. The objects can also be small, such as items used with handheld electronic devices. The objects can also be found or used in environments that increase the likelihood of the physical markings being damaged or dirtied.

With respect to FIG. 1, the system 100 may include various components, assemblies, and systems (including sub-systems) that interact with each other to provide a suggested identity of a character(s)-of-interest. The system 100 may also be configured to acquire images that include the character(s)-of-interest. For example, the system 100 may include an imager 104 that is configured to capture one or more images 106 of the markings 110, 111 on an object 108. The object 108 has a surface 109 with a small, convex curvature. As shown in the exemplary image 106, the markings 110, 111 include physical markings 110 that are dot-peened onto the surface 109 and physical markings 111 that are scratched by an individual or machine-penned onto the surface 109. Other physical markings can be cast or molded with the object 108 during manufacture.

In the illustrated embodiment, the system 100 may include a single housing 102 that is configured to hold the imager 104 and other components of the system 100. The housing 102 may be sized and shaped for an individual to hold and carry and may include a grip 103. In such embodiments, the system 100 may resemble a handheld price scanner. Alternatively, the system 100 and the housing 102 are not sized for an individual to carry. By way of one example only, the system 100 could be a part of an assembly line or other automated system in which the objects are imaged as the objects pass by on a conveyor belt. The alternative system 100 could have a stationary position with respect to the conveyor belt.

The imager 104 may include a lens or lenses 124 and an imaging sensor 126 configured to acquire the images 106. The imaging sensor can be a charge-coupled device (CCD), a complimentary metal oxide semiconductor (CMOS), or another type of imaging sensor. The imager 104 may include other features that may be used with imagers/cameras, such as an auto-focus mechanism, viewfinder, and/or a lighting system that is configured to illuminate the surface 109 of the object 108 during acquisition of the image 106. As shown, the system 100 may also include a user interface 122 that may receive user inputs from the user and/or communicate information to the user. For instance, the user interface 122 may include a display that identifies the objects scanned by the system 100 or provides suggested identities of the characters-of-interest and/or the objects. As used herein, providing a "suggested identity" and like terms may include providing an ideal character (e.g., the letter or number without any noise) or may include providing a closer estimation of how the character-of-interest should appear, which may include some noise. In some embodiments, the user can enter information or instructions to assist the system 100 in identifying the characters-of-interest.

As shown in FIG. 1, after acquiring the image 106, data representing the image 106 may be communicated to a system controller 114. The system controller 114 may include one or more processors or modules, illustrated as modules 116-120, that communicate directly or indirectly with one another. The system controller 114 is illustrated conceptually as a collection of modules, but may be implemented utilizing any combination of dedicated hardware boards, DSPs, processors, and the like. The system controller 114 can also be implemented utilizing an off-the-shelf PC with a single processor or multiple processors, with the functional operations distributed between the processors. The modules described herein also may be implemented utilizing a hybrid configuration in which certain modular functions are performed utilizing dedicated hardware, while the remaining modular functions are performed utilizing an off-the-shelf PC and the like. The modules also may be implemented as software modules within a processing unit or system memory.

The modules 116-120 include a segmentation module 116, an identification module 117, a sparse distributed memory (SDM) module 118, an interface module 119, and a database 120. The segmentation module 116 is configured to analyze the image 106 and convert at least a portion of the markings 110, 111 into a corresponding feature vector (described in greater detail below). For example, in some embodiments, the segmentation module 116 separates the image into portions to isolate characters-of-interest. The portions of the image 106 may then be converted into pixel (e.g., binary) images and analyzed to generate corresponding feature vectors. The identification module 117 is configured to receive the feature vector and, for at least one of the characters-of-interest, use the SAM module 118 to identify the character(s)-of-interest. The interface module 119 may be configured to communicate with the other modules 116-118, 120 and the user interface 122.

Figure 2:
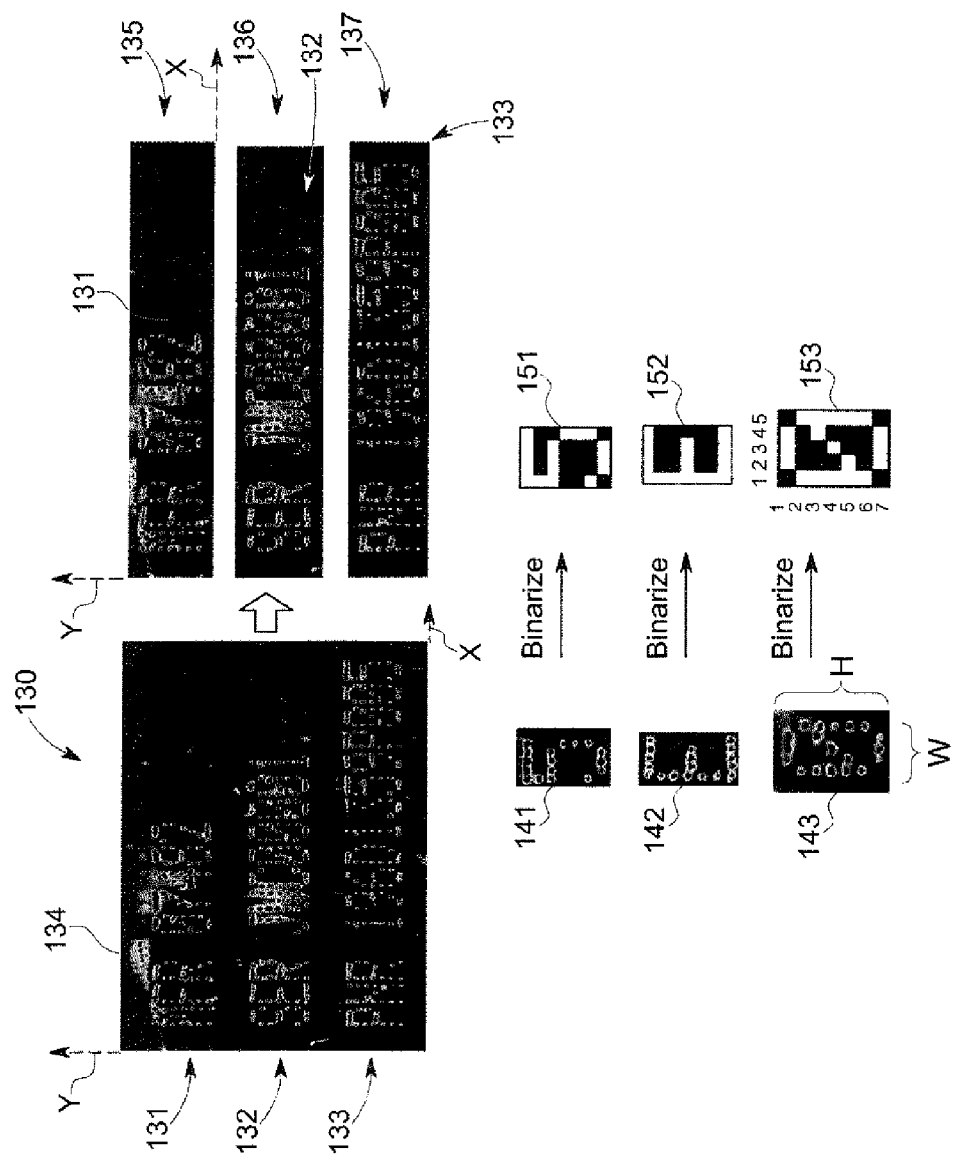
FIG. 2 illustrates segmentation and conversion of an acquired image into pixel images by the system of FIG. 1.
Figure 3:
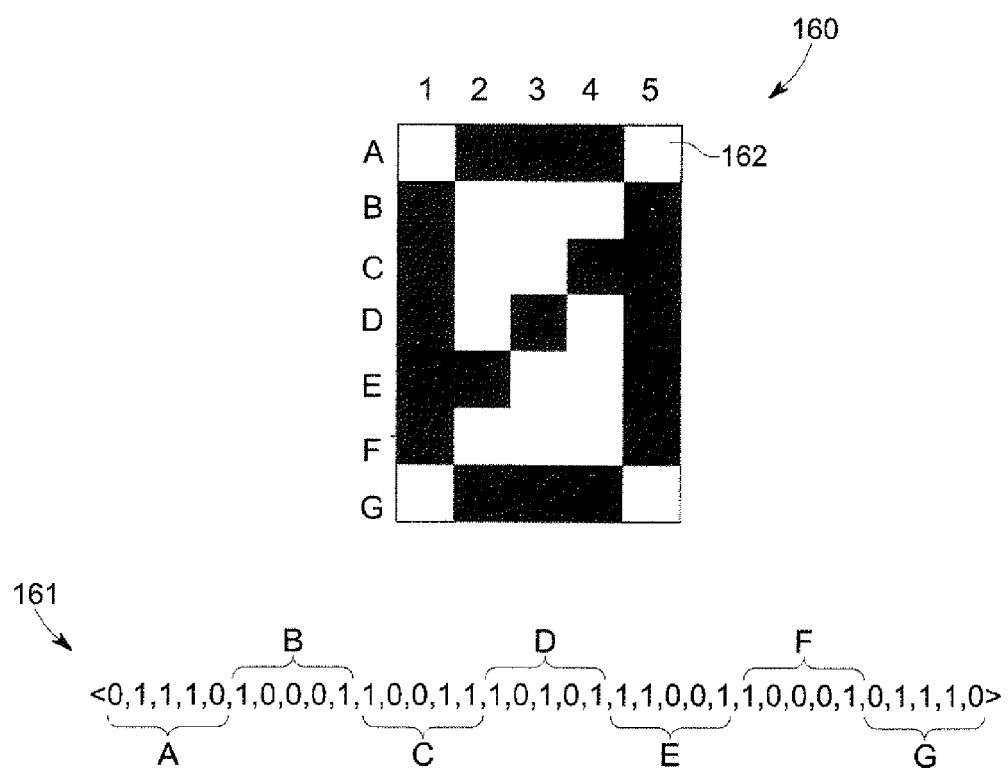
FIG. 3 illustrates a pixel image and a corresponding feature vector that is converted from the pixel image by the system of FIG. 1.

FIGS. 2 and 3 illustrate conversion of an enhanced image 130 (FIG. 2) into pixel or binary images 151-153 (FIG. 2) or 160 (FIG. 3) that are then converted into feature vectors 161 (FIG. 3). The enhanced image 130 may be based on an acquired image, such as the image 106 (FIG. 1), that has been processed to enhance the physical markings along the surface of the object. The enhanced image 130 could have, among other things, an increased contrast. In other embodiments, the acquired image 106 is not enhanced prior to conversion of the image 106 into the pixel images 151-153, 160 and/or into the feature vectors 161.

The physical markings shown in the image may include the characters-of-interest as well as other unwanted physical changes, such as any unintended scratches or unwanted dirt that may have collected onto the surface. For example, the enhanced image 130 shown in FIG. 2 includes three separate character lines 131-133 of individual characters. A character line includes a series of characters-of-interest that are substantially aligned along a portion of the corresponding image. The enhanced image 130 also includes a scratch 134 that extends across the surface near the line 131. As shown, some of the characters-of-interest or portions thereof may be brighter or darker than others in the enhanced image 130. The brighter portions may correspond to regions of the surface that are physically changed more than other regions of the surface. For example, the brighter portions may correspond to regions that are more indented than other regions.

The segmentation module 116 can be configured to separate the enhanced image 130 to isolate the characters-of-interest. In some embodiments, the segmentation module 116 may separate the image 130 into line sections 135-137, respectively, as shown in FIG. 2. Each of the line sections 135-137 includes one of the character lines 131-133. As one example of separating the image 130, the segmentation module 116 may scan a Y-axis of the enhanced image 130 and analyze a total signal in a direction along an X-axis. For those portions along the scan that are below a threshold, the enhanced image 130 can be separated or segmented to provide, for example, the line sections 135-137. After separating the line sections 135-137, the segmentation module 116 may perform a similar analysis for each of the line sections 135-137. For example, with respect to the line section 135, the segmentation module 116 may scan along the X-axis and analyze a total signal in a direction along the Y-axis. For those portions along the scan that are below a threshold or predetermined value, the line section 135 may be segmented to provide individual character images 141-143 of the enhanced image 130. In an exemplary embodiment, the character images 141-143 include a single character-of-interest. However, in other embodiments, the character images 141-143 can include more than one character-of-interest.

The segmentation module 116 may also be configured to convert the character images 141-143 into the binary images 151-153. In some embodiments, the segmentation module 116 scans along the X and Y-axes of each of the character images 141-143 to determine dimensions of the character-of-interest within the corresponding character image and remove extraneous portions. For example, the segmentation module 116 may determine a height H and width W of the character-of-interest in the character image 143 (i.e., the number zero) and remove outer portions of the character image 143 that surround the character-of-interest thereby providing an edge-enhanced character image (not shown).

The segmentation module 116 may then analyze separate blocks or cells of the edge-enhanced character image to pixelize (or binarize) the image. By way of example only, the segmentation module 116 may compare an intensity signal of each of the cells to a predetermined threshold. If the intensity signal of the corresponding cell exceeds the threshold, the cell is labeled as having a first value (e.g., 1). If the intensity signal of the corresponding cell is less than the threshold, the cell is labeled as having a different second value (e.g., 0). If the intensity signal is equal to the threshold, the cell can be labeled as having the first or second value. As shown in FIG. 2, the binary images 151-153 are 5×7 matrices of cells. Hence, the binary images 151-153 have 35 cells in the illustrated embodiment. In other embodiments, the binary images may have less than about 60 cells or less than about 100 cells. However, in other embodiments, the binary images have more than about 100 cells.

Although the pixelization process described above labels each cell as having only one of two cell values, other pixelizing processes may use a different number of cell values (e.g., 1 of N values). For example, there can be three possible cell values depending upon the intensity signal of the cell. Moreover, the pixelization process can be modified in other manners if desired. For example, instead of only considering the intensity signal of the corresponding cell, the intensity signals of adjacent cells may be considered when assigning a cell value.

FIG. 3 shows an exemplary binary image 160 having an array of cells 162. The segmentation module 116 may also be configured to convert binary (or pixel) images into feature vectors. As such, the segmentation module 116 may also be referred to as a vector-generating module. As shown in FIG. 3, the array of cells 162 are arranged in rows A-G and columns 1-5, but other arrangements may be used. Each cell 162 has a cell location and a cell value. With respect to FIG. 3, the binary image 160 may be converted by the segmentation module 116 into a feature vector 161. The feature vector 161 is illustrated as including a string or set of 1's and 0's. In some embodiments, the segmentation module 116 analyzes each row of cells 162 in the binary image 160. Alternatively, the segmentation module 116 may analyze each column of cells 162.

Each cell 162 has a cell location (or address) that can be defined by the row and column of the cell 162. As shown, row A includes cells that exceeded the predetermined threshold as discussed above (indicated in black) and also cells that did not exceed the threshold (indicated in white). Specifically, cell A1 has a cell value of 0; cell A2 has a cell value of 1; cell A3 has a cell value of 1; cell A4 has a cell value of 1; and cell A5 has a cell value of 0. Rows B-G have cells 162 with cell values as indicated. As shown in the feature vector 161, the string of cell values in the feature vector is based on the cell locations and the values of the cells. As such, the cell values may be referred to as coordinates in the feature vector. For example, the first three coordinates in the feature vector 161 have values that are derived from the cells A1, A2, A3 . . . and the last three coordinates have values that are derived from the cells G3, G4, G5.

In some SDM algorithms used in various embodiments, the feature vector (or input vector) includes both a vector address and a data pattern. In some embodiments, the vector address and/or the data pattern of the feature vector 161 is based upon (a) the cell locations and (b) the values of the cells. In an exemplary embodiment, the vector address of the feature vector 161 and the data pattern of the feature vector 161 are the same. This may be referred to as the autoassociative mode. Although the illustrated embodiment uses an autoassociative protocol, other embodiments may have different values representing the vector address and the data pattern. For example, the vector address may be a three-digit number and the data pattern may be the same as shown in FIG. 3.

Figure 4:
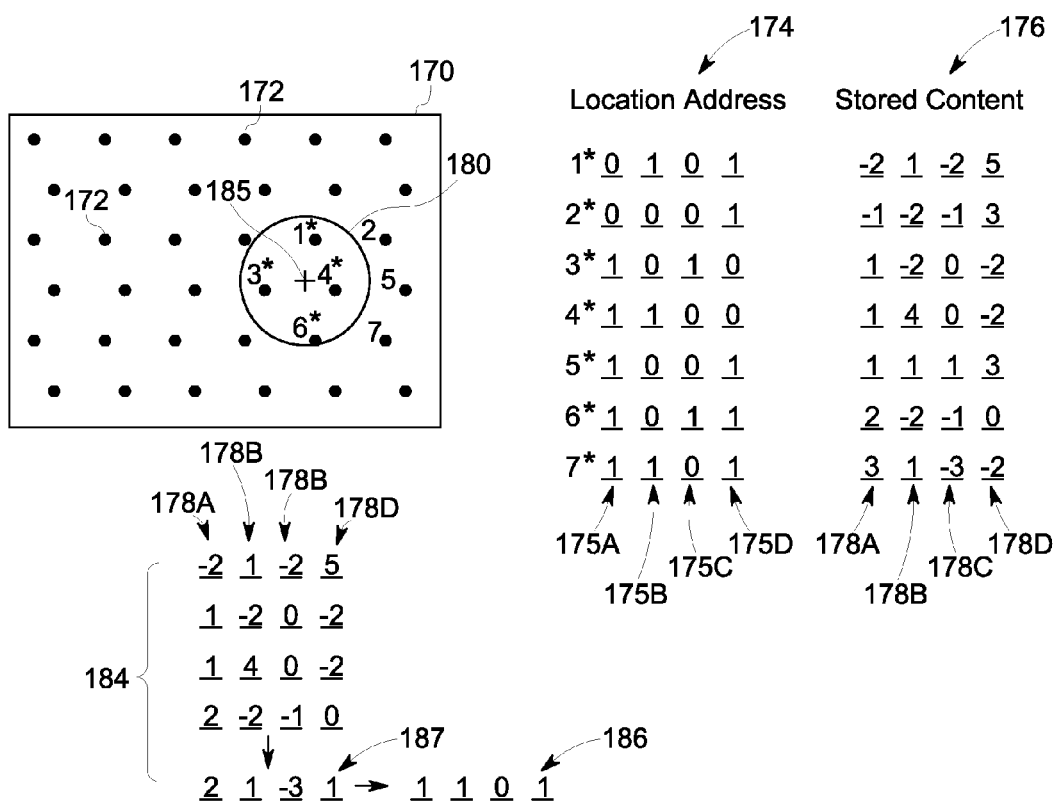
FIG. 4 illustrates training a sparse distributed module (SDM) and/or providing a suggested identity of a character-of-interest using the system of FIG. 1.

FIG. 4 illustrates how the system 100 may provide a suggested identity of a character-of-interest. FIG. 4 includes a representative view of the SDM module 118, which includes hard locations 172. Each of the hard locations 172 has a stored vector location address 174 of an address space 170 and stored content counters 178. The SDM module 118 may be characterized as having an address space 170 where the hard locations 172 are located (only a portion of the address space 170 is shown in FIG. 4). The address space 170 is at least partially based on the number of coordinates in the feature vector 161. In some embodiments, the address space 170 may be based on a total number of possible vector addresses. For example, the feature vector 161 includes a set of thirty-five (35) coordinates, wherein each coordinate has a possible value of 0 or 1. Thus, the total number of possible vector addresses in this example is $2^{35}$ or approximately 35 billion addresses.

As shown in FIG. 4, the address space 170 has a plurality of the hard locations 172 that are distributed within the address space 170. For example, the hard locations 172 may have a binomial distribution with the address space 170. The hard locations 172 may be used to identify the character(s)-of-interest based on the sparse distributed memory techniques described herein. A total number of hard locations 172 can be relatively small or sparse compared to the total number of possible addresses. For example, the address space 170 may have 1.4 million hard locations 172 out of a total of approximately 35 billion locations in the address space 170. In an exemplary embodiment, the hard locations 172 are substantially evenly distributed throughout the address space 170. The stored vector location address 174 of each hard location 172 may have the same number of coordinates 175 of the feature vector 161. However, for illustrative purposes in FIG. 4, the stored vector location address 174 of each hard location 172 has only four coordinates 175A-175D. The stored content counters 178A-178D include a number of counters that equals the number of coordinates 175 in the hard location 172 and in the feature vector 161. Again, for illustrative purposes, only four counters 178A-178D are shown in FIG. 4 for each hard location 172.

In some embodiments, the system 100 is configured to train the SDM module 118. Alternatively, a previously trained or modified SDM module 118 may be provided to the system 100. To train the SDM module 118, the system 100 may scan numerous objects (e.g., tens or hundreds) having markings thereon and convert the markings into feature vectors as described above. The feature vectors may then be written or stored into the SDM module 118 to train the SDM module 118 in identifying characters-of-interest. More specifically, the identification module 117 may determine a relative distance between the vector address of the feature vector 161 and at least some of the stored vector location addresses 174 of the hard locations 172. In some embodiments, the identification module 117 determines a relative distance between the stored vector address of the feature vector 161 and each one of the stored vector location addresses 174 of the hard locations 172. By way of illustration, the vector address of the feature vector to-be-stored, such as the feature vector 161, is represented in the address space 170 as cross-hairs 185. As shown, the cross-hairs 185 are located relatively close to the hard locations 172 that are indicated as numbers (nos.) 1, 3, 4, and 6 in the address space 170.

The identification module 117 may determine the relative distance between the feature vector to-be-stored and the hard locations 172 using various algorithms. The relative distance may be determined by calculating, for example, the Hamming distance between the feature vector to-be-stored and one of the hard locations 172. Other exemplary algorithms for calculating the relative distances include the Manhattan distance and the Euclidean distance. The Hamming distance essentially determines the number of coordinates in the feature vector to-be-stored that have a different value than the corresponding coordinates 175 of the stored location address of each of the hard locations 172. Using the hard locations 172 as an example of calculating the Hamming distance, the Hamming distance between the hard location no. 1 and hard location no. 2 is 1 unit, because the hard locations nos. 1 and 2 only differ at the second coordinate 175B. The relative distance between the hard location no. 1 and the hard location no. 3 is 4 units, because the hard locations nos. 1 and 3 differ at all four coordinates 175A-175D.

The identification module 117 may then compare the calculated relative distance associated with the hard locations 172 to a predetermined distance or threshold value. The circle 180 that surrounds the hard locations nos. 1, 3, 4, and 6 in FIG. 4 may represent the predetermined distance value. The hard locations 172 that are within the predetermined distance (i.e., the hard locations nos. 1, 3, 4, and 6) are considered to be "activated" and, as such, those hard locations 172 may be referred to as activated locations. The activated locations are indicated with asterisks in FIG. 4.

After identifying the activated locations from the hard locations 172, the data pattern of the queried feature vector can then be stored into the stored content counters 178 for those hard locations 172 that are activated. For example, the stored content counters 178 may be incremented and/or decremented. Each counter 178A-178D corresponds to one of the coordinates (e.g., the counter 178A corresponds to the coordinate 175A, the counter 178B corresponds to the coordinate 175B, and so on). According to one embodiment, for each coordinate in the feature vector to-be-stored that has a value of 1, the corresponding counter 178 increases by 1 (or incremented by 1). For each coordinate having a value of 0, the corresponding counter 178 decreases by 1 (or decremented by 1). By way of one particular example, if the data pattern of the feature vector to-be-stored was <1, 0, 1, 0>, then—for each one of the activated locations—the first counter 178A would add one to its total; the second counter 178B would subtract one from its total; the third counter 178C would add one to its total; and the fourth counter 178D would subtract one from its total. After numerous feature vectors have been stored into the SDM module 118, the stored content counters 178 of the hard locations nos. 1-7 might be as shown in FIG. 4.

The identification module 117 is also configured to provide a suggested identity of the character(s)-of-interest. In other words, the identification module 117 may identify (or provide a better estimation of) the character-of-interest to the user of the system 100. In some embodiments, the identification module 117 may use a feature vector to retrieve an output vector that is then used to provide the suggested identity. The identification operation is similar to the training operation discussed above. However, the SDM module 118 is typically already trained or modified in some manner before the system 100 is used to analyze markings on objects.

Again, the feature vector being applied to the SDM module 118 during the identification operation may be represented as the cross-hairs 185 in the address space 170. The location of the cross-hairs 185 is based on the vector address of the feature vector, which can be determined by the segmentation module 116. As before, the identification module 117 may determine the relative distance between the feature vector and the hard locations 172 (e.g., by calculating the Hamming distance or through other algorithms, such as Manhattan or Euclidean). The identification module 117 then compares the calculated relative distances to a predetermined distance value to identify the activated locations. Again, the hard locations nos. 1, 3, 4, and 6 in FIG. 4 may represent the activated locations. It should be noted that the predetermined distance value for storing feature vectors and the predetermined distance value for retrieving output vectors are not required to be the same. For example, storing a feature vector may only require a Hamming distance of 4, but retrieving an output vector may require a Hamming distance of 3.

In some embodiments, to provide the suggested identity of the character-of-interest, the stored content counters 178 of the activated locations are then summed-and-thresholded as indicated at reference numeral 184. More specifically, the counters 178A of the activated locations are combined (e.g., summed or added together); the counters 178B of the activated locations are combined; the counters 178C of the activated locations are combined; and the counters 178D of the activated locations are combined. The resulting vector may be referred to as a summed-content vector 187 that includes a set of values. As shown in FIG. 4, the exemplary summed-content vector from the summing operation is <2, 1, −3, 1>. The number of values in the set of values is equal to the number of coordinates in the feature vector.

According to one embodiment, each of the sums is then compared to a threshold to provide an output vector 186. For example, if the value in the summed-content vector 187 is greater than a threshold value of zero, a value of 1 is provided in the corresponding output vector 186. If the value in the summed-content vector 187 is less than a threshold value of zero, a value of 0 is provided in the corresponding output vector 186. If the value is equal to zero, values of 0 or 1 can be provided in the corresponding output vector 186. In the illustrated example, the output vector 186 has values of <1, 1, 0, 1>. In other embodiments, a threshold value other than zero may be used.

Accordingly, in some embodiments, the feature vector in the training and retrieval operations may facilitate identifying a select number of the hard locations 172 as activated locations in the address space 170 of the SDM module 118. The stored content counters of the activated locations may then be used to generate a single output vector 186. The output vector 186 is based on the stored content counters of the activated locations that, in turn, can be based on previously stored feature vectors.

In some embodiments, the output vector 186 may be converted into a binary image, such as the binary image 160, using a similar cell location and value standard as described above. More specifically, each coordinate in the output vector 186 having a value of 1 will correspond to a cell that is black and each coordinate having a value of 0 will correspond to a cell that is white. The binary image 160 may then be provided to the user through, for example, the user interface 122. In such embodiments, the suggested identity may include some noise. In other embodiments, the output vector 186 may undergo further analysis or processing to determine an ideal character that the output vector is closest to that does not include noise. The ideal character may then be provided to the user interface 122. Accordingly, the suggested identity shown to the user may or may not correspond to the ideal character.

Figure 6:
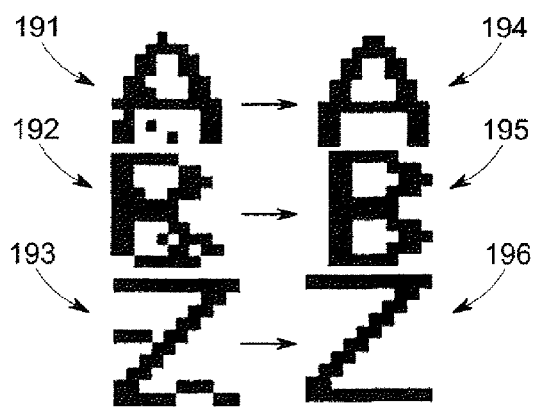
FIG. 6 illustrates exemplary binary images of characters-of-interest that may be identified by the system of FIG. 1.

FIG. 6 illustrates exemplary binary images 191-193 of characters-of-interest that may be identified by various embodiments described herein. As shown, the binary images 191-193 do not include ideal representations. For example, the physical markings corresponding to the binary images 191-193 may have been physically damaged (e.g., scratched, worn), or the physical markings may have collected dust or other material. Embodiments described herein are configured to analyze image data of the physical markings and provide output representations 194-196 that indicate the identity of the characters-of-interest.

Figure 5:
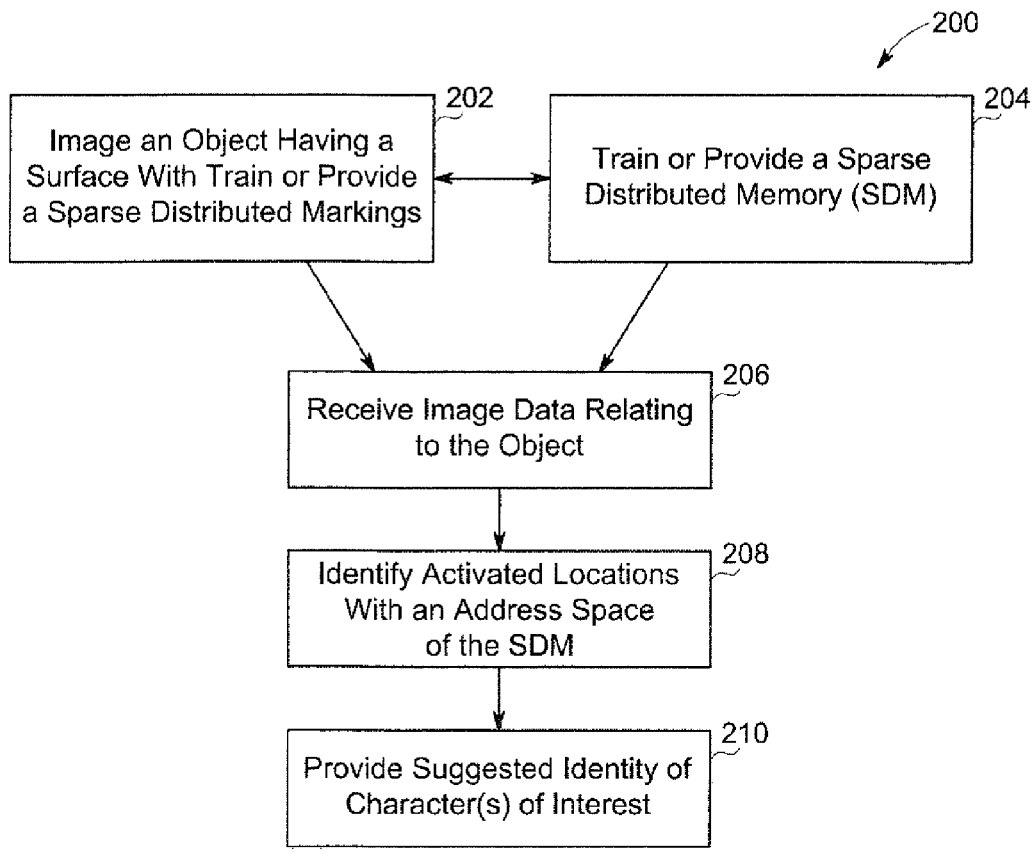
FIG. 5 is a flowchart illustrating a method of identifying characters from an object having physical markings.

FIG. 5 is a flowchart illustrating a method 200 of identifying characters from an object having physical markings. The method 200 may be implemented by the system 100. A non-transitory computer readable medium may also include instructions to command a processor to perform the method 200. The method 200 includes imaging at 202 an object having a surface with markings thereon. The markings may be physical markings. The imaging operation at 202 may include using an imager, such as the imager 104, or other camera system to acquire an image of the physical markings on the object In an exemplary embodiment, the imager or camera system is part of a system or device that is dedicated almost exclusively to character-recognition and to communication of the suggested characters. However, in other embodiments, the system or device may be used for various applications. By way of one example only, the system or device may be a personal communication device, such as a smart phone, or a portable computer (e.g., laptop, tablet, and the like). The personal communication device or the portable computer can have a software application for character-recognition stored in the device or computer. The imager could be a camera system that is integrated with the device or computer. Alternatively, additional components for imaging could be removably attached to the device or computer.

Before or after the imaging operation at 202, the SDM can be trained or provided at 204. In one example, the SDM can be trained using the images acquired by the system as described above with respect to FIG. 4. Alternatively, previously-acquired image data may be received from a stored database. For instance, if the user desired to train the SDM in a particular manner, the user could request that the SDM be trained with feature vectors that are derived from physical markings found on a particular type of object. Objects of a particular type may be marked in a similar manner. For example, same-type objects may be marked in the same way (e.g., dot peened) and in the same manner (e.g., 5×7 matrix). The user could be even more particular and request feature vectors of objects that have been marked by one particular machine, because that machine may have As (or other alphanumeric characters) that are unique to A's of other machines of the same type. The user may specify the request in other manners as well.

In other embodiments, the training operation at 204 may constitute receiving an SDM. More specifically, the training operation at 204 may include receiving an SDM that has been previously trained or modified in some manner. For example, the stored content counters of the hard locations in the trained SDM may already have particular values. As such, the time necessary to train the SDM by repeatedly storing feature vectors may be avoided. The SDM may be configured for a particular object. By way of one particular example only, an SDM may be trained for rotors that were manufactured in a particular year at one plant. It should be noted that the training operation at 204 may or may not be performed.

The method 200 may also include receiving at 206 image data that relates to the object having characters-of-interest. The image data may be received from the imager or other camera system immediately after acquisition of the image, or the image data can be received from a database. After receiving the image data, the image data may be analyzed at 208 to convert at least one of the characters-of-interest into a corresponding feature vector as described above.

With the SDM, the method 200 includes identifying at 208 activated locations by determining a relative distance between the feature vectors and the stored vector location addresses of the hard locations. As described above, non-limiting examples of the relative distance include the Hamming distance, the Manhattan distance, or the Euclidean distance. Regardless of the manner in calculating the relative distance, the activated locations may be determined by comparing the calculated relative distances to a predetermined distance value.

The method 200 also includes providing a suggested identity at 210 of the character(s)-of-interest based on the stored content counters of the activated locations as described above. The suggested identity may be generated from an output vector provided by the SDM. The suggested identity may be a character that includes some noise or an ideal character without any noise.

At least one technical effect of some embodiments is the suggested identity of a character-of-interest using an SDM in which the character-of-interest has been damaged, dirtied, or are otherwise rendered more difficult to read. Other technical effects for some embodiments include training an SDM for a system or device that is subsequently used to provide suggested identities of the characters-of-interest.

The various components and modules described herein may also be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (CPUs), logic circuits, and any other circuit or processor capable of executing the functions described herein. The above examples are exemplary only, and are thus not intended to limit in any way the definition and/or meaning of the term "computer" or "module".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program, which may form part of a tangible, non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A non-transitory computer readable medium for identifying characters using at least one processor and a sparse distributed memory (SDM) module, the computer readable medium including instructions to command the processor to:
   receive image data relating to an object having a surface with physical markings thereon, the physical markings including characters-of-interest;
   generate a binary image for at least one character-of-interest of the characters-of-interest, the binary image having a plurality of cells, wherein each cell of the plurality of cells is defined at least in part by a cell location;
   analyze the image data to convert the at least one character-of-interest of the characters-of-interest in the image data into a corresponding feature vector, the feature vector including a vector address and a data pattern, wherein the vector address is based on the cell location corresponding to the at least one character-of-interest; and
   identify the at least one character-of-interest of the characters-of-interest using the SDM module, the SDM module having hard locations that include a stored vector location address and a stored content counter, wherein the identifying operation includes:
      determining a relative distance between the vector address of the feature vector and the stored vector location addresses of the hard locations, wherein the hard locations that are within a predetermined distance from the vector address are activated locations; and
      providing a suggested identity of the corresponding characters-of-interest that is based upon the stored content counters of the activated locations.

2. The computer readable medium of claim 1, further comprising instructions to command the processor to store the data pattern of the feature vector in the stored content counters of the activated locations.

3. The computer readable medium of claim 1, wherein each cell of the plurality cells is further defined at least in part by a value, the data pattern of the feature vector being based upon the value.

4. The computer readable medium of claim 3, wherein the value is either a first value or a different second value.

5. The computer readable medium of claim 1, wherein the binary image has less than 100 cells.

6. The computer readable medium of claim 1, wherein the image data includes lines of the physical markings in which at least two of the lines include a plurality of the characters-of-interest from the characters-of-interest, and wherein the computer readable medium includes instructions to command the processor to separate the lines horizontally and separate the lines vertically to isolate the plurality of the characters-of-interest.

7. The computer readable medium of claim 1, wherein the vector address of the feature vector is also the data pattern of the feature vector.

8. The computer readable medium of claim 1, wherein the computer readable medium includes instructions to command the processor to provide the suggested identity only after a plurality of objects have been imaged.

9. The computer readable medium of claim 1, wherein the suggested identity includes an alphanumeric character.

10. The computer readable medium of claim 1, wherein the relative distance is a Hamming distance between the vector address and the corresponding vector location address in the SDM.

11. A system for identifying characters-of-interest from physical markings on a surface of an object, the system comprising:
   a segmentation module configured to:
      receive an image of the object having physical markings that include characters-of-interest;
      generate a binary image for at least one character-of-interest of the characters-of-interest, the binary image having a plurality of cells, wherein each cell of the plurality of cells is defined at least in part by a cell location;
      convert the at least one character-of-interest of the characters-of-interest into a corresponding feature vector, the feature vector including a vector address and a data pattern, wherein the vector address is based on the cell location corresponding to the at least one character-of-interest;
   an identification module configured to identify characters-of-interest using a sparse distributed memory (SDM) module, the SDM module having hard locations that include a stored vector location address and a stored content counter, wherein the identification module is configured to:
      determine a relative distance between the vector address of the feature vector and the stored vector location addresses of the hard locations, wherein the hard locations that are within a predetermined distance from the vector address are activated locations; and
      provide a suggested identity of the corresponding character-of-interest that is based upon the stored content counters of the activated locations.

12. The system of claim 11, further comprising an imager configured to acquire an image of the physical markings on the object.

13. The system of claim 12, further comprising a device housing that is sized and shaped to be handheld and carried by an individual, the device housing holding the imager and a non-transitory computer readable medium that includes the segmentation and identification modules.

14. The system of claim 11, wherein each cell of the plurality of cells is further defined at least in part by a value, the data pattern of the feature vector being based upon the value.

15. The system of claim 11, wherein the acquired image includes lines of the physical markings in which at least two of the lines include a plurality of the characters-of-interest from the characters-of-interest, and wherein the segmentation module is configured to separate the image horizontally to separate the lines and separate the image vertically to isolate the plurality of the characters-of-interest.

16. The system of claim 11, wherein the vector address of the feature vector is also the data pattern of the feature vector.

17. The system of claim 11, wherein the suggested identity includes an alphanumeric character.

18. The system of claim 11, wherein the relative distance is a Hamming distance between the vector address and the corresponding stored vector location address.

19. A method of identifying characters from an object having physical markings, the method comprising:
   receiving image data relating to an object having a surface with physical markings thereon, the physical markings including characters-of-interest;

generating a binary image for at least one character-of-interest of the characters-of-interest, the binary image having a plurality of cells, wherein each cell of the plurality of cells is defined at least in part by a cell location;

analyzing the image data to convert the at least one character-of-interest of the characters-of-interest into a corresponding feature vector, the feature vector including a vector address and a data pattern, wherein the vector address is based on the cell location corresponding to the at least one character-of-interest;

providing hard locations that include a stored vector location address and a stored content counter;

identifying activated locations by determining a relative distance between the feature vectors and the stored vector location addresses of the hard locations, wherein the relative distances between the feature vector and the activated locations are less than a predetermined distance; and providing a suggested identity of the at least one character-of-interest that is based upon the stored content counters of the activated locations.

20. The method of claim 19, further comprising storing the data pattern of the feature vector in the stored content of the activated locations.

21. The method of claim 19, wherein each cell of the plurality of cells is further defined at least in part by a value, the data pattern of the feature vector being based upon the value.

22. The method of claim 19, wherein the image includes a plurality of lines of the physical markings in which at least two of the lines include a plurality of the characters-of-interest from the characters-of-interest, and wherein the analyzing operation includes separating the image horizontally to separate the lines and separating the image vertically to isolate the plurality of the characters-of-interest.

23. The method of claim 19, wherein the vector address of the feature vector is also the data pattern of the feature vector.

24. The method of claim 19, wherein the determining the relative distance operation includes determining a Hamming distance between the vector address and the corresponding stored vector location address.

* * * * *